200
UNITED STATES PATENT OFFICE.

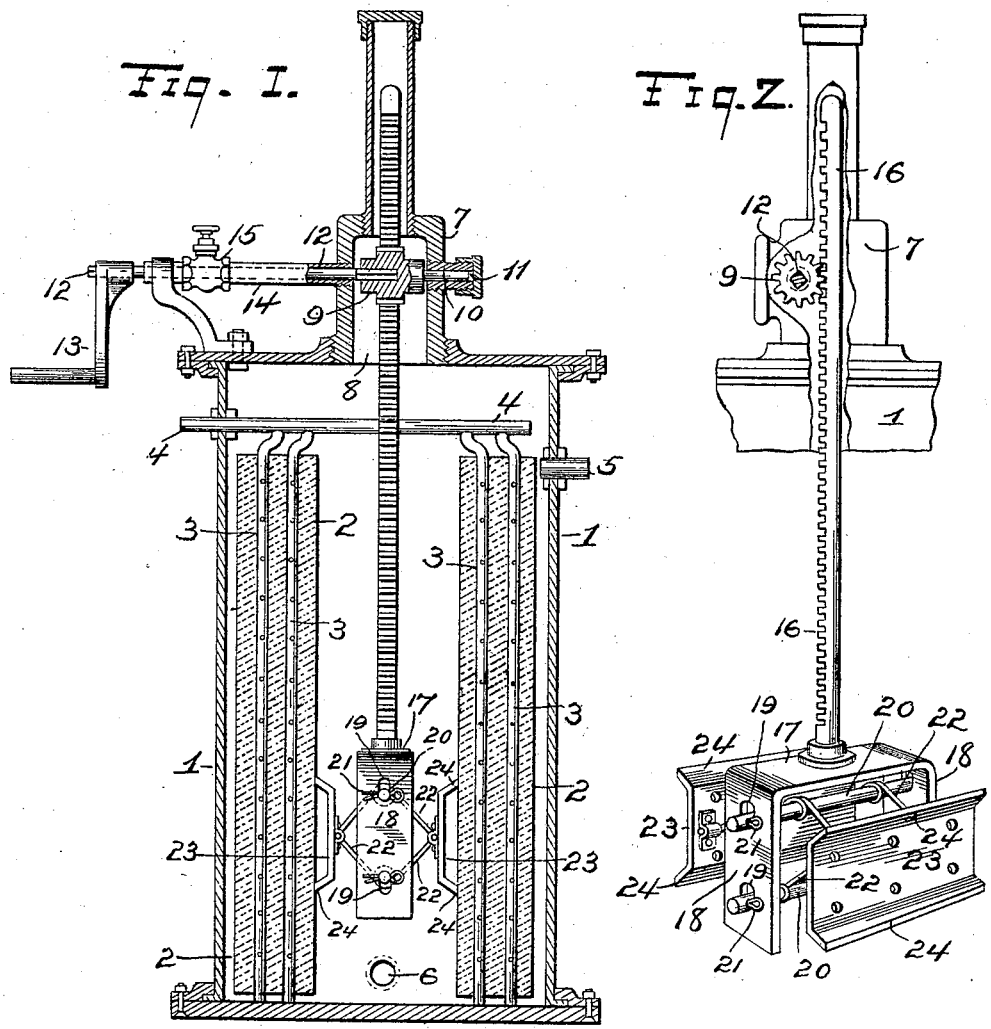

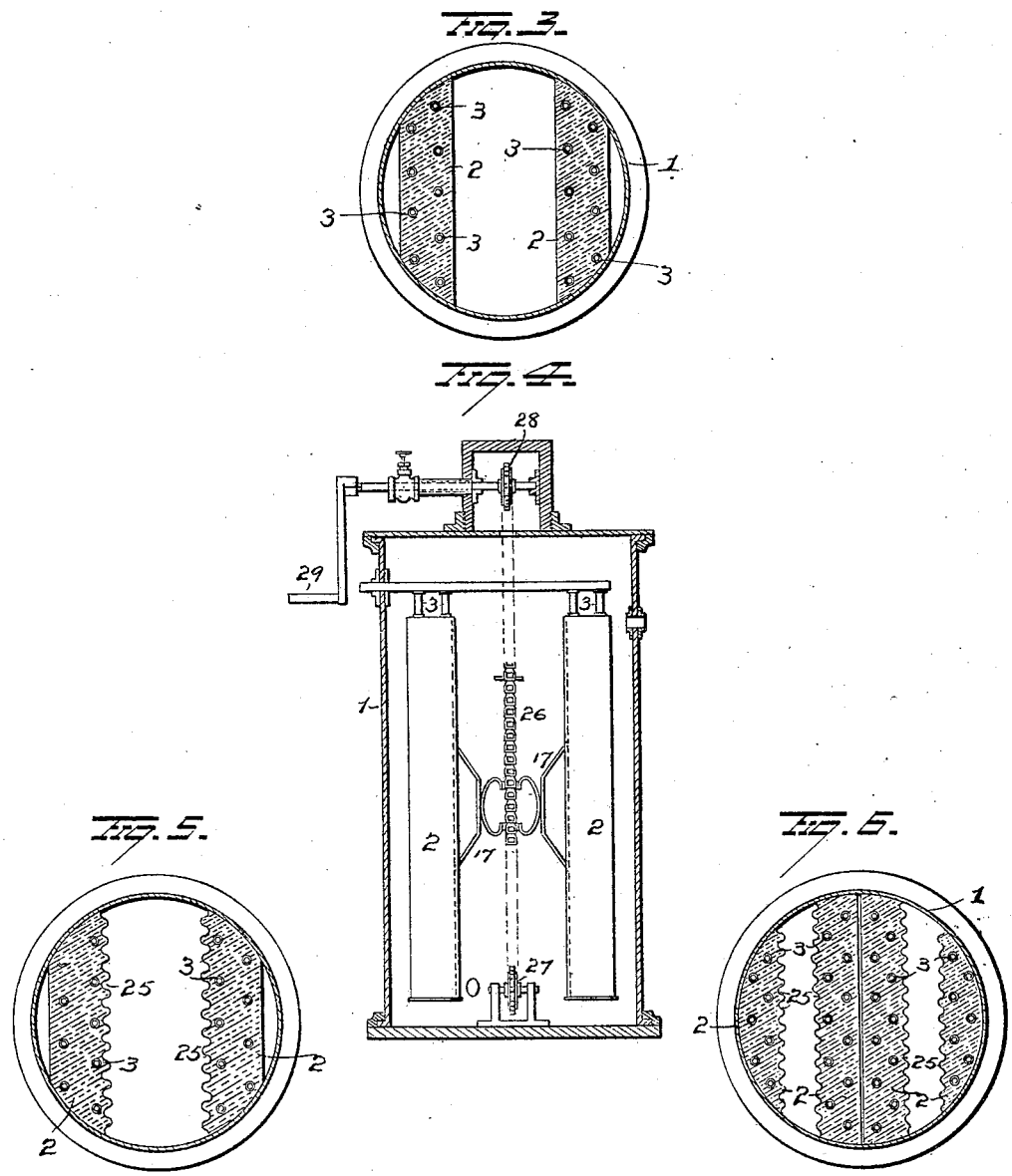

EMILE BENDIX AND FREDERICK OTTO BENDIX, OF NEW ORLEANS, LOUISIANA.

FILTER.

No. 856,332.  Specification of Letters Patent.  Patented June 11, 1907.

Application filed August 20, 1906. Serial No. 331,416.

*To all whom it may concern:*

Be it known that we, EMILE BENDIX and FREDERICK OTTO BENDIX, residents of New Orleans, in the parish of Orleans and State of Louisiana, have invented certain new and useful Improvements in Filters; and we do hereby declare the following to be a full, clear, and exact description of the invention, such as will enable others skilled in the art to which it appertains to make and use the same.

Our invention relates to improvements in filters, the object of the invention being to provide an improved arrangement of filtering walls and improved mechanism for cleaning them, and the invention consists in certain novel features of construction and combinations and arrangements of parts as will be more fully hereinafter described and pointed out in the claims.

In the accompanying drawings, Figure 1 is a view in vertical section illustrating our improved filter, and Fig. 2 is a perspective view of the cleaning mechanism. Fig. 3 is a view in cross section through the filter: Figs. 4, 5 and 6 are views showing modifications.

1 represents the body or casing of the filter, in which filtering stones 2 are mounted and provided with tubular perforated cores or pipes 3, connected at their upper ends with an outlet pipe 4 for discharging the filtered water.

5 is a water inlet to the casing, and 6 is a discharge opening through which the dirty water is discharged when the filter is being cleaned.

A gear casing 7 is secured on top of filter casing 1 and communicates therewith through an opening 8 in the top of casing 1. A pinion 9 is located in the gear casing 7 and provided with a journal 10 mounted in a tubular closed bearing 11 and provided with an angular socket, to receive the angular end of a removable shaft 12, having a crank arm 13 thereon to turn the pinion, as will hereinafter appear. This shaft 12 is inserted in a tubular bearing 14, communicating with gear casing 7 and provided with a gate valve 15 to close the tube 14 when the shaft 12 is removed, and the filter is in operation. The pinion 9 meshes with a long vertical rack bar 16 projecting down into filter casing 1 and carrying our improved cleaner 17.

The cleaner 17 comprises an inverted U-shaped yoke or frame 18 secured on rack bar 16 and provided with alined elongated slots 19 in its depending ends, to receive parallel shafts 20 secured in the slots 19 by cotter pins 21 or other suitable fasteners. Springs 22 are coiled between their ends around shafts 20 and secured at their ends to scrapers 23, the latter being preferably perforated and provided with scraping flanges 24 at their longitudinal edges. The springs 22 press the scrapers 23 outward against the filtering stones, and the slots 19 permit a certain amount of lost motion and compel the springs to act alternately.

If desired, the surface of the filtering stones may be corrugated as shown at 25, Figs. 5 and 6 to increase the filtering surface, and more than one pair of these stones may be provided as shown in Fig. 6. The scrapers may be operated simultaneously by sprocket gearing as shown in Fig. 4. In this construction, I employ a sprocket chain 26 to which the scrapers 17 are secured, and this sprocket chain passes over sprocket wheels 27—28, the shaft of the latter being provided with a suitable handle 29.

The operation of our improvements is as follows:—To clean the filter, the discharge 6 is opened, and gate valve 15 opened. Shaft 12 is inserted into tube 14 and engages pinion 9, and as the pinion is oscillated, the rack bar 16 is reciprocated up and down to move the spring pressed scrapers 23 over the surface of the filtering stones, to thoroughly clean them, the dirt being carried off with the water through the discharge opening 6. When cleaned, shaft 12 is removed, gate valve 15 closed and discharge opening 6 closed, when the filter is ready for operation as before.

A great many slight changes might be made in the general form and arrangement of the parts described without departing from our invention, and hence we do not restrict ourselves to the precise details set forth but consider ourselves at liberty to make such slight changes and alterations as fairly fall within the spirit and scope of our invention.

Having fully described our invention, what we claim as new and desire to secure by Letters Patent is:—

1. In a filter, the combination with a casing, and a pair of filtering stones therein, of a reciprocating frame between the stones, and spring pressed scrapers carried by the frame and bearing against the stones.

2. In a filter, the combination with a casing and a pair of filtering stones therein, of a reciprocating frame between the stones, and perforated spring pressed scrapers carried by the frame and bearing against the stones.

3. In a filter, the combination with a casing having water inlet and discharge openings, and a gear casing communicating with the filter casing, of filtering stones in the filter casing, a pinion in the gear casing, a rack bar in mesh with the pinion and projecting into the filter casing, a frame secured on the rack bar having elongated alined slots, shafts in said slots, springs coiled about the shafts, scrapers secured to the ends of the springs and bearing against the stones, and means for oscillating the pinion.

4. In a filter, the combination with a casing having a water inlet and a dirty water discharge, and a gear casing communicating with the filter casing, of filtering stones in the filter casing, a pinion in the gear casing, a rack bar in mesh with the pinion and projecting into the filter casing, a frame secured on the rack bar having elongated alined slots, shafts in said slots, springs coiled about the shafts, scrapers secured to the ends of the springs and bearing against the stones, a tubular bearing communicating with the gear casing, a gate valve in said tube, and a crank shaft to enter the tube and constructed to lock with the pinion to turn the latter.

5. In a filter, the combination with a pair of filtering stones, of a reciprocating frame between the stones, scrapers comprising metal plates having their edges bent to form scrapers to engage the stones, and springs connecting both scrapers with the frame and forcing them away from the frame and against the filtering stones.

6. In a filter, the combination of two parallel flat filtering stones, a reciprocating frame between the stones, scraper plates having parallel scraping edges, and springs connecting the scraper plates and frame and pressing the scraping edges against the stones.

In testimony whereof, we have signed this spcification in the presence of two subscribing witnesses.

EMILE BENDIX.
FREDERICK OTTO BENDIX.

Witnesses:
   ANTHONY J. ROSSI,
   JOHN S. PAUL.